(12) United States Patent
Matthiesen et al.

(10) Patent No.: US 10,243,994 B2
(45) Date of Patent: Mar. 26, 2019

(54) QUANTITATIVELY MEASURING RECERTIFICATION CAMPAIGN EFFECTIVENESS

(71) Applicant: International Business Machines Corporation, Armonk, NY (US)

(72) Inventors: Brian Robert Matthiesen, Santa Margarita, CA (US); Gee Ngoo Chia, Morrisville, NC (US); Jean Elizabeth Hidden, Wake Forest, NC (US); Stephen James Turcol, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 14/842,873

(22) Filed: Sep. 2, 2015

(65) Prior Publication Data
US 2017/0063872 A1  Mar. 2, 2017

(51) Int. Cl.
  *G06F 17/00* (2006.01)
  *H04L 29/06* (2006.01)
(52) U.S. Cl.
  CPC ............ *H04L 63/20* (2013.01); *H04L 63/123* (2013.01)
(58) Field of Classification Search
  CPC ......... G06Q 10/0639; G06Q 10/06395; G06Q 10/06398; G06Q 10/063112; H04L 63/20; H04L 63/123
  See application file for complete search history.

(56) References Cited

U.S. PATENT DOCUMENTS

| | | | |
|---|---|---|---|
| 8,181,016 B1 * | 5/2012 | Borgia | G06F 21/604 713/156 |
| 2002/0172931 A1 | 11/2002 | Greene et al. | |
| 2003/0044760 A1 | 3/2003 | Banerjee et al. | |
| 2003/0163343 A1 | 8/2003 | Meiser et al. | |
| 2006/0015930 A1 * | 1/2006 | Shoham | H04L 63/0823 726/6 |
| 2007/0274506 A1 | 11/2007 | Schundler | |
| 2009/0030762 A1 | 1/2009 | Lee et al. | |
| 2010/0011346 A1 | 1/2010 | Louis et al. | |
| 2011/0307957 A1 | 12/2011 | Barcelo et al. | |
| 2013/0067538 A1 * | 3/2013 | Dharmarajan | G06F 21/45 726/4 |
| 2016/0378748 A1 * | 12/2016 | Shoshan | G06Q 10/06311 704/2 |

* cited by examiner

*Primary Examiner* — Trong H Nguyen
(74) *Attorney, Agent, or Firm* — Jeffrey S. LaBaw; David H. Judson

(57) ABSTRACT

An identity management system is augmented to provide a methodology to generate an objective measure of administrative effectiveness with respect to account certification. In the approach, erroneous account information is intentionally inserted into a recertification campaign. The erroneous account information is tracked through the recertification process and used as a measurement to evaluate whether a particular manager/administrator whose accounts are impacted is successful in recognizing the erroneous account information (e.g., as a percentage of erroneous account records located). The dummy information is tracked and used to generate a quantitative measure of the effectiveness of a particular recertification campaign or a particular manager who is responsible for recertifying accounts. The results can also be used to drive other enterprise metrics and compliance systems.

21 Claims, 4 Drawing Sheets

Indicate whether or not Judith Hall still requires each of the following accounts and groups:

- Please note that all items require a decision

| Accounts and Groups | Description | Still Required | All \| None |
|---|---|---|---|
| hjudith on grottofalls.tivlab.raleigh.ibm.com | | ○ Yes  ⊙ No | All \| None |
| • svt3 | | ○ Yes  ⊙ No | All \| None |
| jhall on grottofalls.tivlab.raleigh.ibm.com | | ⊙ Yes  ○ No | All \| None |
| • svt1 | | ⊙ Yes  ○ No | |
| • svt2 | | ⊙ Yes  ○ No | |
| jhall on Hornbid AIX Service | | ⊙ Yes  ○ No | All \| None |
| • mail | | ⊙ Yes  ○ No | |
| • staff | | ⊙ Yes  ○ No | |

Preview the impact of your selections

Reviewer Comments

Enter Comments:

Judith will need Role 2 for her next assignment. We are consolidating resources on grottofalls, so I am rejecting her secondary account on that service

FIG. 6

QUANTITATIVELY MEASURING RECERTIFICATION CAMPAIGN EFFECTIVENESS

BACKGROUND

Technical Field

This disclosure relates generally to the field of digital resource access, and more particularly to risk-based computer recertification of online access.

Background of the Related Art

Identity and Access Management Governance is a set of processes and policies for organizations to manage risks and maintain compliance with regulations and policies by administering, securing, and monitoring identities and their access to applications, information, and systems. Although potentially complex in implementation, the concept of Identity and Access Management (IAM) Governance is fairly straightforward: determine who should have access to what resources and who should not, according to government regulations, industry-specific regulations (SOX, HIPPA, GLBA, etc.), and business regulations and guidelines. Typically, key aspects of IAM Governance include access request governance, entitlement certifications, reports and audits, and analytics and intelligence (including role management, entitlement management, separation of duties enforcement, and privileged identity management). An end-to-end IAM Governance solution may also provide related functions, such as access enforcement, user provisioning, password management, and user lifecycle management.

Identity and access management (IAM) systems protect enterprise data and applications with context-based access control, security policy enforcement and business-driven identity governance. These systems may be operated in a standalone manner, in association with cloud-based environments, or in hybrid environments.

Automated systems for IAM health checking detect identity-centric risks within a governance system by scanning for one or more weakness patterns, such as too many Admins configured, account sharing, or cloning of access permissions. One IAM task involves conducting an audit of existing accounts and determining whether the entitlements associated with an identified account should be recertified. The notion of recertification typically involves reaching out to a user proactively and asking whether he or she still needs the account. The known approach to role recertification determines whether there is a continued business need (CBN) for a particular person to be a member of a particular role.

Managers tend to rubberstamp recertification requests and not review them thoroughly. A related problem is that identity governance programs are not very effective at finding unused (or dormant) accounts. Further, known prior art techniques do not provide for quantitative measures to determine recertification campaign effectiveness.

It would be highly desirable to provide IAM systems with the ability to provide a way to measure the effectiveness of a recertification campaign.

BRIEF SUMMARY

According to this disclosure, an identity management system is augmented to provide a methodology to generate an objective measure of administrative effectiveness with respect to account certification. In the approach, erroneous account information is intentionally inserted into a recertification campaign. The erroneous account information is tracked through the recertification process and used as a measurement to evaluate whether a particular manager/administrator whose accounts are impacted is successful in recognizing the erroneous account information (e.g., as a percentage of erroneous account records located). The dummy information is tracked and used to generate a quantitative measure of the effectiveness of a particular recertification campaign or a particular manager who is responsible for recertifying accounts. The results can also be used to drive other enterprise metrics and compliance systems.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 6 is a representative display interface by which an approving entity verifies whether particular accounts should be recertified.

DETAILED DESCRIPTION OF AN ILLUSTRATIVE EMBODIMENT

Figure 1:
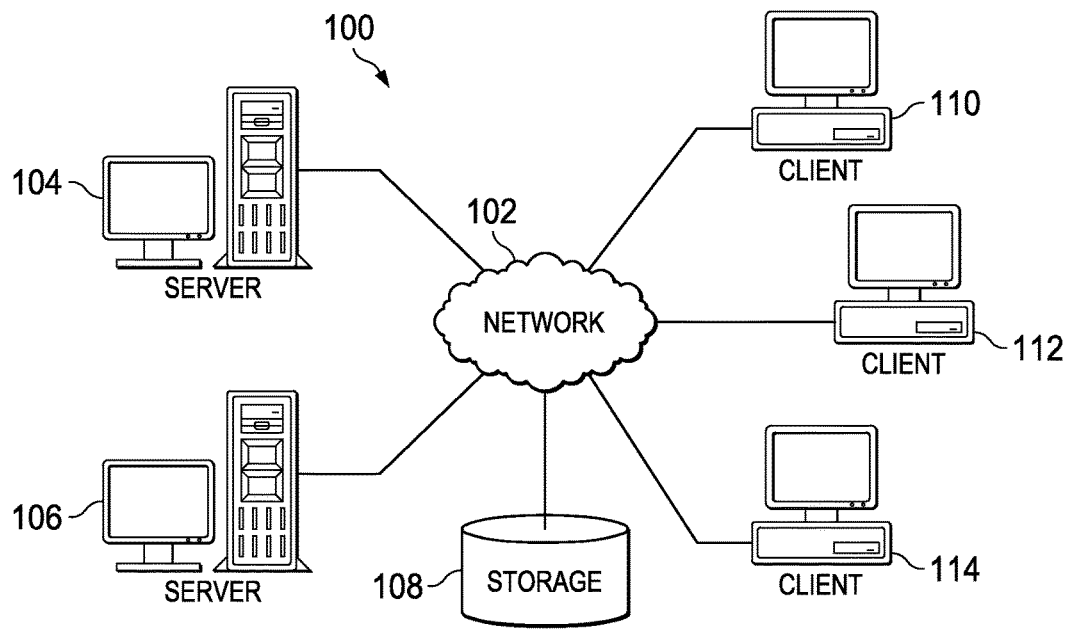
FIG. 1 depicts an exemplary block diagram of a distributed data processing environment in which exemplary aspects of the illustrative embodiments may be implemented.
Figure 2:
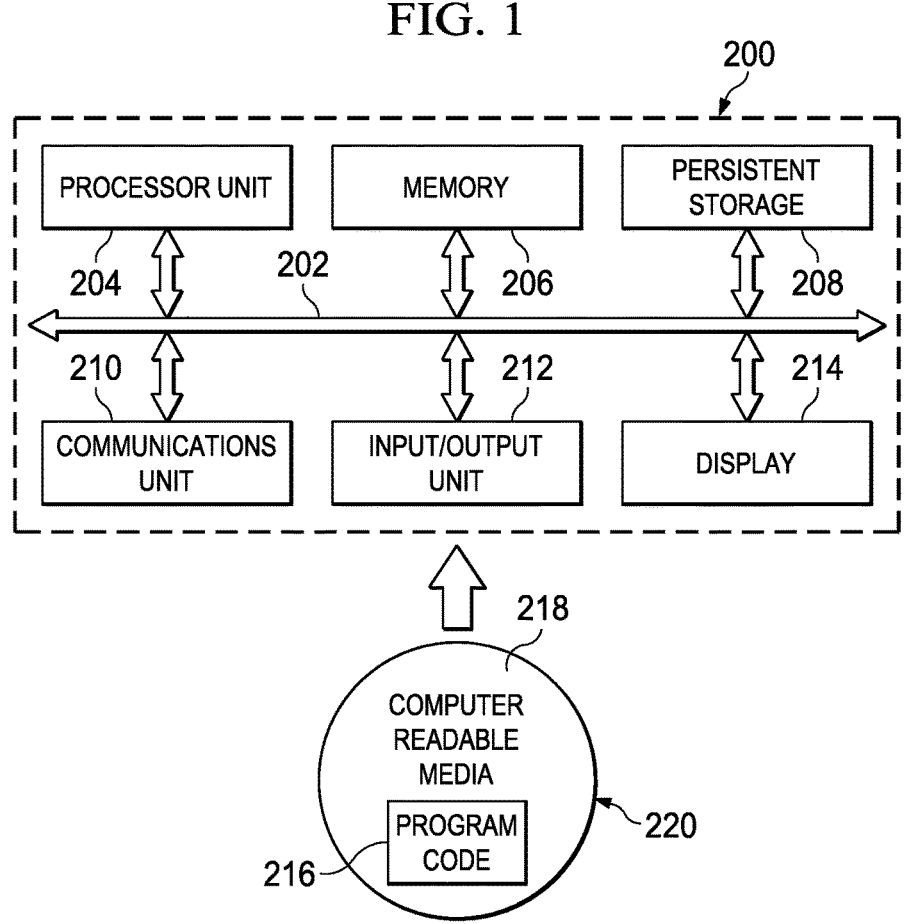
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device.

Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Identity and Access Management

As used herein, an "account" typically refers to an entity that contains a set of parameters that define application-specific attributes of a principal, which include the identity, user profile, and credentials.

"Access" refers the ability to read, update, delete, or otherwise use a resource. Access to protected resources is typically controlled by system software.

A "credential" refers to a declaration of authorization or other security attributes of a subject that is typically validated and signed by a trusted third party. Typically, a credential represents the ID and authenticators (such as a password) for a resource.

A "continued business need" (CBN) is a notification (e.g., by email or otherwise) to an account owner asking if the owner continues to have a legitimate need to access the account.

An "entitlement" refers to a capability-based reason that a user is given a permission or set of permissions to access IT resources (services).

An "identity" refers to a subset of profile data that uniquely represents a person or entity and that is stored in one or more repositories.

A "dormant account" is an account that has not been used for a given, preferably configurable-time period (e.g., a number of days). A dormant account typically is associated with a service. Preferably, servers in the system are configured to record last login information, and to provide (return) this information upon request. By reconciling the last login information, the system can determine the existence of dormant accounts.

A "dormant account report" lists the accounts that are not recently used, and it may include the service information of the dormant account, the number of days dormant, and a list of accounts dormant as of the report date. Preferably, accounts that do not have last access information are not considered dormant. Accounts that are not dormant include both new accounts for which a Last Access Date field is blank, and existing accounts that are not used.

An "orphan account" is an account on a managed resource, an account whose owner cannot be automatically determined by the system.

An "ownership type" refers to a category that classifies ownership accounts. One account preferably can have only one type of ownership. Accounts can be marked with different ownership types depending on their use. Default ownership types include, for example, device, personal, system, and vendor.

A "person" is an individual in the system that has a person record in one or more corporate directories.

A "policy" is a set of considerations that influence the behavior of a managed resource or a user.

A "principal" is a person or group that has been granted permissions. It also refers to an entity that can communicate securely with another entity.

A "recertification" refers to the process of validating and possibly updating credentials with a system, typically after a specified time interval. A "recertification policy" refers to a policy that defines the life cycle rule for automatically validating accounts and users in a provisioning system at a specified frequency. The policy sends approvals to the recertification policy participants asking if the accounts or users are still to be certified.

In identity management, "provisioning" refers to the process of providing, deploying, and tracking a service or component. To "provision" means to set up and maintain the access of a user to a system, or to create an account on a managed resource.

A "provisioning policy" is a policy that defines the access to various managed resources (services), such as applications or operating systems. Access is granted to all users, users with a specific role, or users who are not members of a specific role.

A "resource" is a hardware, software, or data entity.

A "role" is a logical group of principals that provide a set of permissions. Access to resources is controlled by using provisioning policy to grant access to a role. A role can also represent a group of principals based on business job title or other business-related attributes.

A "service" is a representation of a managed resource, application, database, or system. In an identity management system, typically a service represents the user repository for a managed resource.

A "user" is an individual, organization, process, device, program, protocol, or system that uses the services of a computing system. For example, a user is an individual who uses the identity management system to manage their accounts and passwords, or that is managed by the system.

A "user recertification policy" is a policy that provides a periodic re-validation process for a user's role memberships, accounts, and group membership of accounts. Typically, user recertification combines recertification of multiple resources and memberships into a single activity to be completed by a designated approver.

For many applications, networks, databases and other resources, users are given "access" by an authority or administrative role to enable activity associated with the resource. The conditions and limitations of the access for a given user are referred to as the "access entitlement" of the user, and include defined limitations as to the activities the user may perform with or on the resource. Access entitlements among users of the same resource can vary. For instance, a database administrator may have access and authority to read, write, edit, search, copy, delete and transfer data for a specific database, whereas others with access to the database may be limited to searching and reading data.

Identity management (IdM) is an administrative area that utilizes a system to identify individuals with membership or association, such as with a group, organization, company, etc. Additionally, an IdM system controls the individual's access to resources by use of restrictions or permissions. To facilitate better decisions for granting appropriate access, information regarding a user's request for access, their job role, and whether the access is a new request or renewal is considered, however, this limited information can prove ineffective in preventing high risk situations.

Control and oversight of resource access approval of individuals in business or enterprise organizations are further challenged by the turnover of personnel, the dynamic day-to-day changes and organizational restructuring, as well as application version upgrades. In large organizations, granting users the appropriate access entitlements to resources and maintaining access entitlements is a difficult task that can involve thousands of users and hundreds of resources. Resource access decisions and compliance verification responsibilities are typically allocated to supervisors or managers, who have few tools to facilitate decisions or identify risks and due to time constraints, often provide access in the belief that the individuals' performance will improve or not be impacted.

It is known in the prior art to provide software and services to deploy policy-based provisioning solutions. These solutions helps companies automate the process of provisioning employees, contractors, and business partners with access rights to the applications they need, whether in a closed enterprise environment or across a virtual or extended enterprise. A known product of this type is IBM® Security Identity Manager.

Figure 3:
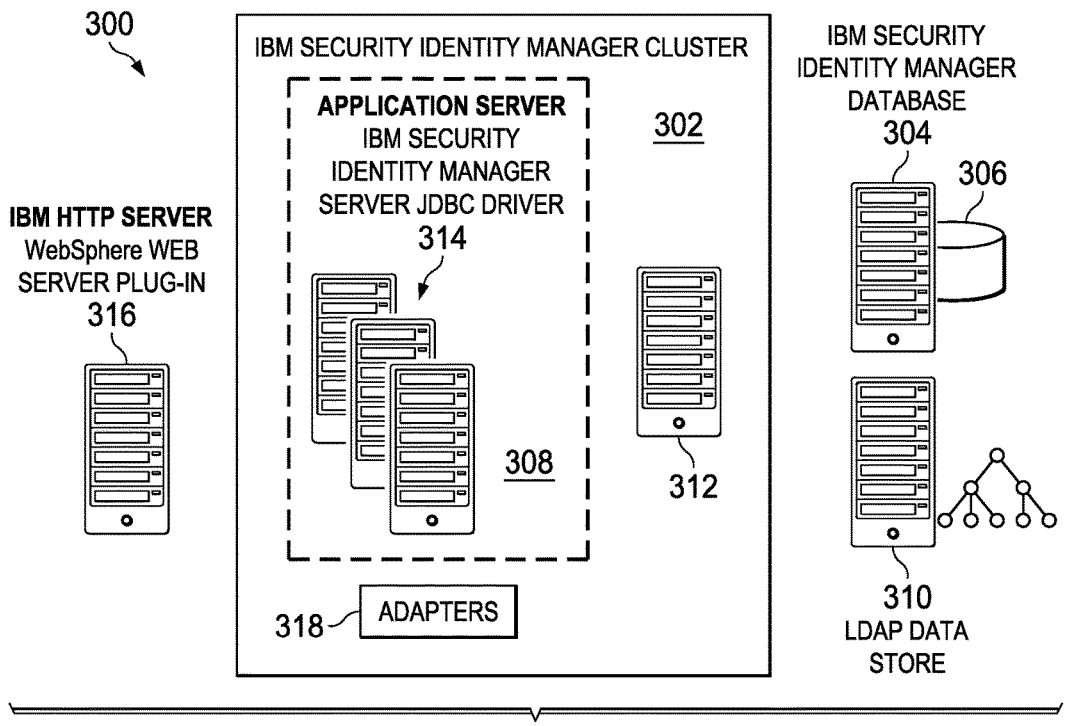
FIG. 3 is a representative security identity management system in which the disclosed subject matter may be implemented.

FIG. 3 is a block diagram of this commercially-available identity manager solution. In one embodiment, as will be described, the techniques of this disclosure may be implemented in such a solution. This identity manager solution, however, is merely representative and should not be taken to limit this disclosure. The representative commercial implementation is known as IBM® Security Identity Manager, Version 6.0. That product manages the identity records that represent people in a business organization. In particular, the product is an identity management solution that centralizes the process of provisioning records, such as provisioning accounts on operating systems, applications, etc., to users. Among other features, the product affords an organization the ability to add business processes and security policies to basic user management. The solution also affords the ability to add approvals for user requests to access requests. In general, the solution provides a uniform way to manage user accounts and to delegate administration, including self-service and a help desk user interface.

As illustrated in FIG. 3, the main components of the IBM® Security Identity Manager solution 300 include IBM Security Identity Manager Server 302 and required and optional middleware components, including adapters that provide an interface to managed resources. In a cluster configuration as illustrated, the components include a database server 304 that stores transactional and historical data, and a relational database 306 that maintains current and historical states of data. Computers that communicate with the database typically require a Java™ Database Connectivity driver (JDBC driver) 308. For example, a JDBC driver enables an IBM Security Identity Manager Server to communicate with a data source. IBM Security Identity Manager supports a JDBC type 4 driver to connect a Java-based application to a database. The supported database products are IBM DB2® Database, Oracle DB, and MS SQL Server database. As also seen in FIG. 3, the solution also includes a directory server 310 to store a current state of the managed identities (including user account and organizational data) in an LDAP (or equivalent) directory. Thus, for example, IBM Security Identity Manager supports the following products: IBM Tivoli® Directory Server, and Sun Enterprise Directory Server. The solution also preferably includes a directory integrator 312, such as IBM Tivoli Directory Integrator, to synchronize identity data in different directories, databases, and applications. IBM Tivoli Directory Integrator synchronizes and manages information exchanges between applications or directory sources. The solution also includes one or more application servers 314, such as IBM WebSphere® Application Server. WebSphere Application Server runs a Java virtual machine (JVM) that provides a runtime environment for the application code. The application server provides communication security, logging, messaging, and Web services. As also seen in FIG. 3, typically the configuration includes one or more WebSphere Application Servers and a deployment manager that manages the cluster. The solution also typically includes an HTTP server and WebSphere Web Server plug-in 316. An HTTP server provides administration of IBM Security Identity Manager through a client interface in a web browser. Finally, the solution typically includes one or more IBM Security Identity Manager adapters 318. An adapter is a program that provides an interface between a managed resource and the IBM Security Identity Manager Server. Adapters function as trusted virtual administrators on the target platform for account management. For example, adapters do such tasks as creating accounts, suspending accounts, and modifying account attributes. An IBM Security Identity Manager adapter can be either agent-based or agentless. An agent-based adapter is one wherein the user installs adapter code directly onto the managed resource with which it is designed to communicate. An agentless adapter is deployed onto the IBM Security Identity Manager Server and the system that hosts IBM Tivoli Directory Integrator. In this case, the adapter code is separate from the managed resource with which it is designed to communicate.

As noted above, the implementation shown in FIG. 3 is not intended to be limiting but, rather, merely illustrates one possible operating environment; other commercial or proprietary implementations may include similar components and functionalities.

Each of the machines shown in FIG. 3 may be implemented using the machine architecture shown in FIG. 2; the various machines may interact with one another as illustrated in FIG. 1.

The security identity management solution of this type also may be implemented in whole or in part in a cloud-based solution.

Figure 4:
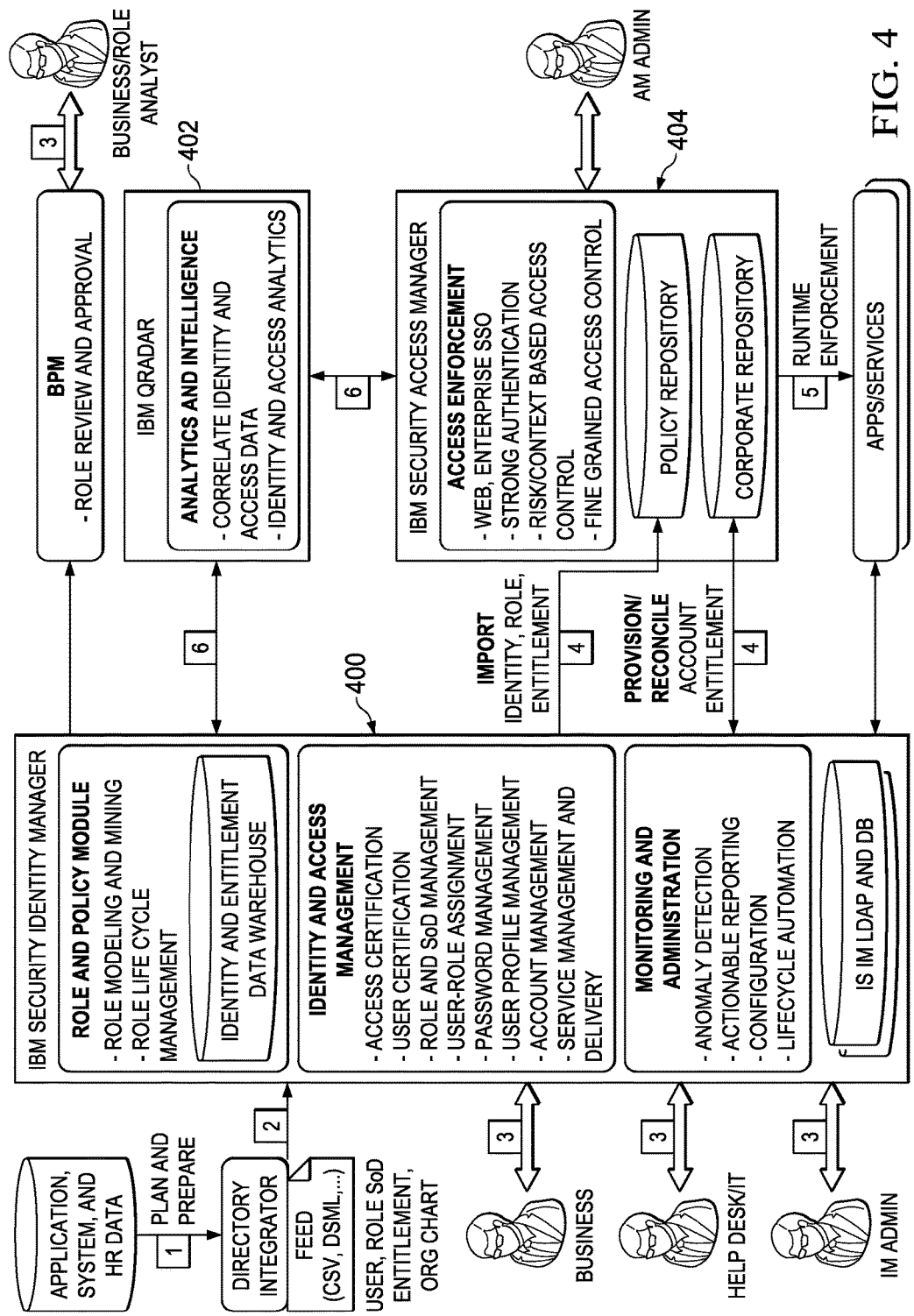
FIG. 4 illustrates a step-by step-guide for implementing IAM governance using an Identity and Access Management system.

FIG. 4 illustrates a representative step-by step-guide for implementing IAM governance using an Identity and Access Management system 400 such as IBM Security Identity Manager. In this embodiment, an end-to-end solution is provided in association with several other systems including a Security Information and Event Management (SIEM) software system 402 (e.g., IBM QRadar®), and an access and entitlement enforcement system (e.g., IBM® Security Access Manager) 404.

At step (1), the enterprise identifies the resources that it wants protected and the accesses it wants certified and monitored. The data is cleaned, filtered, and prepared for loading into the Identity and Access Management system 400 through TDI, LDAP Feed, flat files (CSV, DSML, etc.), or API. At step (2), the data may be loaded into a role and policy module 402 for modeling and management. This data can come from various sources: Human Resources (HR), a planning and modeling tool, or manual entry. In a typical use case, the data gathered during planning is saved (e.g., in a standard CSV file) and then imported into IBM Security Identity Manager for role and policy modeling. The system can export the modeled role and entitlement data (e.g., in XML format) and load it for lifecycle management and certification. At step (3), stakeholders and participants can use the Identity and Access Management system 400 for the various tasks that they must perform, such as requesting accesses and roles, approving access and role requests, certifying, managing, and modeling roles, and reviewing and certifying roles and entitlements. The certification data can be used to clean, adapt, and evolve the system. As step (4), the access and entitlement enforcement system 404 imports or provisions the data from Identity and Access management system 400 into the access and entitlement enforcement systems. At step (5), the enforcement system 404 uses the certified data for runtime enforcement. The SIEM system 402 monitors actual user activity and provides feedback to fine-tune access policy planning, administration, and enforcement.

As illustrated in FIG. 4, one of the responsibilities of the Identity and Access Management system 400 is to provide initial and periodic access certification for continued business needs to help direct and control operations. Access certification typically includes review and certification of user access assignment via role or direct assignment to determine who received access to what, when, and why. It ensures that users have only the privileges and exception entitlements they need to perform their job. Access certification can also be used to detect policy violations, access anomalies, and orphan and dormant accounts. The IAM system typically also maintains certification and access change history, which aids the certification and audit processes.

The system also supports the notion of user to role recertification and user to access recertification according to a recertification policy. Recertification policy simplifies and automates the process of periodically revalidating a target type (account or access) or a membership (role or resource group). Depending on the business needs and the risk level of protected resources, organizations can set a suitable period to perform the scheduled access certification. They can also kick off a certification campaign that is based on-demand or on an event, such as a management event or anomaly detection. The process sends recertification notification (e.g., CBN) and approval events to the participants. A recertification policy includes activities to ensure that users provide confirmation that they have a valid, ongoing need for a specified resource or membership. Typically, the recertification policy also defines the operation that occurs if the recipient declines or does not respond to the recertification request. Recertification policies use a set of notifications to initiate workflow activities in the recertification process. For example, a system administrator of a specific service can create a recertification policy for the service that sets a 90-day interval for account recertification. If the recipient of the recertification declines recertification, the account can be automatically suspended. During the certification process, the system can do bulk or selective certification. For a time-critical certification, the system may provide options to automatically escalate or delegate the action item to an alternate user when timely action is not taken.

Preferably, the system enables certifiers to preview the impact of the certification before submitting it to see if any roles, accounts, or groups are affected by the access decision. Approval and recertification policies deliver change control at the user, role, and access level. Without substantially impacting the business, the change control process can consume any change to the business that affects the user, role, and access structure.

Quantitatively Measuring Recertification Campaign Effectiveness

With the above as background, the subject matter of this disclosure is now described. As described above, and according to this disclosure, an identity management system is augmented (i.e. extended or supplemented) to provide a methodology to generate an objective measure of administrative effectiveness with respect to account certification. According to a representative embodiment, erroneous (or "dummy") account information is intentionally inserted into a recertification campaign. The erroneous account information is tracked through the recertification process and used as a measurement to evaluate whether a particular manager/administrator whose accounts are impacted is successful in recognizing the erroneous account information (e.g., as a percentage of erroneous account records located). Preferably, the dummy information is tracked and used to generate a quantitative measure of the effectiveness of a particular recertification campaign or a particular manager who is responsible for recertifying accounts. The results can also be used to drive other enterprise metrics and compliance systems.

Figure 5:
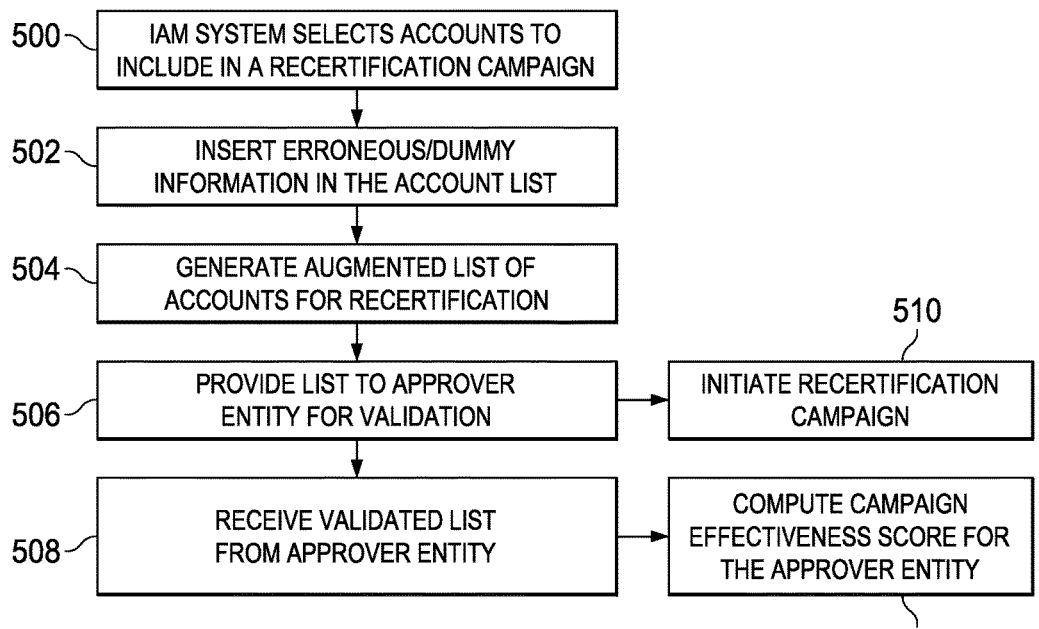
FIG. 5 depicts a process flow of the basic technique of this disclosure.

FIG. 5 is a process flow that depicts that process at a high level. The process begins at step 500 with the IAM system performing a selection of accounts to include in a recertification campaign. This is a conventional operation, and it generates a recertification account list identifying accounts to be recertified. The method may be application-specific or work across multiple applications. At step 502, and before sending the Recertification campaign to be validated (e.g., by a department manager, a business process owner, and application owner, or other participant typical in an IAM recertification process), erroneous account information is inserted into the recertification account list. The notion here involves generating (and populating or seeding the recertification account list) with "reasonable" entries, in that the dummy items are similar in content to the existing campaign accounts. This operation insures that the approver of the recertification campaign must examine the list (including the dummy items) very carefully in order to spot the erroneous entries. For example, in one embodiment step 502 involves selecting (and seeding the list with) names of actual users within the manager's company but who do not actually have an account on the application being recertified. Another example of step 502 is to select (and seed the list with) names similar to those of actual users, but that include subtle misspellings or other inconsistencies (e.g., job title, location, etc.). In another embodiment, step 502 involves selecting (and seeding the list with) the names of account users who are no longer permitted to use the account, or who have left the company's employ. The above are merely exemplary, and one or more combinations of these techniques may be used. Thus, the particular methodology by which these "dummy" entries are generated may vary. They may be determined manually or by some automated (e.g., machine learning or other adaptive) process. In addition, other input data may be considered to facilitate which approach to use. Thus, e.g., if the person being evaluated has already been tested by the approach, that fact may be noted by the system and use to implement more subtle changes to the account list. Thus, the technique herein preferably is adaptive and dynamic in nature, and it is designed to be fine-tuned to accommodate the differences among the various individuals who are being evaluated.

At step 504, the routine continues by combining the erroneous (dummy) data with the actual recertification campaign data comprising the recertification account list. This results in an augmented or supplemented recertification account list that includes both the actual recertification account data, as well as entries that appear as if they are also legitimate account users needed to be recertified. The recertification campaign is now ready to be initiated. To that end, and at step 506, and per a typical IAM process, the generated recertification campaign list is sent for validation to an approving entity, such as department manager, business process owner, application owner or other participant for validation. At step 508, the IAM system captures the approving entity's responses, typically in the form of a "modified" list. The modified recertification account list thus represents the approving entity's efforts to verify which accounts should be evaluated for recertification.

The recertification campaign is then initiated formally at step 510. This is typically an automated process whereby a user identified on the list is notified to determine whether he or she has a continued business need (CBN) for the account on the application. Depending on the response from the affected user, the account may or may not be recertified. The actual account recertification process is ancillary to the technique of this disclosure which, as noted above, is designed to determine how effective the approving is at determining the correctness of the recertification list in the first instance. To this end, and at step 512, upon receipt of the completed campaign, the system calculates a campaign effectiveness score, preferably by examining how many of the erroneous records were found by the approving entity in step 508.

In one embodiment, the system calculates the campaign effectiveness score by determining a percentage of erroneous records found and marked as errors prior to the campaign initiation. For example, if 10 erroneous accounts were inserted and the manager found and marked 8 of them as errors, the Campaign Effectiveness Score would be 80% (8 out of 10). Step 512 can be carried out independently of step 510. At step 514, the campaign effectiveness score is recorded in a database or other storage system.

Preferably, the campaign effectiveness scores are accumulated over time to show trending and auditing reports. These scores may be provided to and used by other systems, such as performance management systems that generate key performance indicators (KPIs), quality of service systems, and the like.

Steps 506 and 508 may be repeated in multiple "rounds" before initiating an actual recertification campaign.

FIG. 6 illustrates a representative display interface 600 by which an approving entity is queried to validate a recertification list entry in the list of accounts. In this example scenario, the user is "Judith Hall." In this example scenario, the user is associated with three (3) accounts and groups, each represented by a row 602 in the display table. The table also includes a "Still Required" column 604 that includes a pair of "Yes" and "No" radio button options for the approving entity to selected. Bulk approvals (per row) are also enabled. As also depicted, preferably the user's identity on each particular application is identified, as well as the user's role. The display panel may also include a Reviewer Comment field 606 in which the approver can provide reasons for approval or disapproval. According to this disclosure, any of the various items depicted may be dummy items. Thus, for example, "Judith Hall" may not be a real person, or the name may be a slight variant of the name of a person who does have the account in question. Or, Judith Hall might be a real person but account "hjudith" (in the first row) might be a fake account. Or, one or more of the group associations identified with the employee may be fake, or variants of real groups.

The system may be programmed to generate different "types" of errors for each user that is being validated. Thus, the display table in FIG. 6 for "Judith Hall" may have a first type of error (e.g., a fake group name), while the next display table (for the next individual) may have a second, distinct type of error. The notion here is that providing different types of errors (across multiple named users being verified) provides for a more-nuanced degree of testing.

The approach has many possible variants. As noted above, the campaign effectiveness score may be computed against the results returned from the approving entity independently of the actual recertification campaign results. Thus, the approach may be used for training purposes, or for evaluating other metrics associated with the IAM recertification mechanism.

As noted above, how "close" the entries are to the real data (for testing purposes) may be based on the level of experience of the individual that is being evaluated using the methodology. Thus, for example, when the approving entity is less highly-skilled (or is otherwise relatively new to the approver position), dummy items may be relatively easier to identify than with respect to items inserted into a list to be evaluated by an experienced approver. As another variant, when different "types" of dummy entries are used within the same list, the campaign effectiveness score may then be based on a "weighted" approach wherein identification of certain errors in the list may be afforded higher scores (because of their relative difficulty in locating) as compared to certain other types of errors. By applying weights to different dummy item types, the campaign effectiveness scores provide more nuanced information regarding the approver's ability to identify erroneous information.

By using the techniques herein, the IAM system generates quantitative measures (in the form of the campaign effectiveness scores) for the approver entities. By providing the results to the approving entities, the system ensures that such entities take much more care in their validation of recertification requests, thereby increasing the overall security results for the IAM system. The resulting recertification process becomes more objective and more useful in ensuring that only users have a continuing business need for their account(s) on the application are even queried for recertification. Using the approach, managers and administrators can determine the actual effectiveness of their recertification campaigns. As a by-product, the approach enables the system to better identify unused (or dormant) accounts that should be removed from the system.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. In particular, the "recertify" configuration tool, the administration page, or the workflow functions (or components thereof) may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the administrator configurator and the suspension workflow components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

Further, any authentication or authorization functionality required herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, identity access and management systems, as well as improvements to the functioning of recertification processes within such systems.

As used here, a list of accounts to be recertified is said to be "augmented" with dummy entries or items. The word "augmented" should be construed broadly to refer, for example, to supplementing, modifying, altering, seeding, or the like.

Having described our invention, what we now claim is as follows:

1. A method to improve an identity and access management computing system that implements an automated recertification campaign with respect to an application in an enterprise, comprising:
   selecting accounts for recertification in accordance with a recertification policy to generate a list of accounts;
   augmenting the list with one or more dummy items, wherein the one or more dummy items represent additional accounts on the application and are configured to appear on the list as legitimate accounts;
   providing for approval the list including the one or more dummy items, the list being provided to an approver entity;
   responsive to receipt from the approver entity of an approval to initiate the recertification campaign, quantifying an effectiveness of the approver entity in locating the one or more dummy items from the list to generate a result;
   using the result as an enterprise metric in association with a compliance component of the identity and access management computing system;
   wherein at least one dummy item of the one or more dummy items is selected for inclusion in the list based on a characteristic of the approver entity.

2. The method as described in claim 1 wherein the recertification campaign is associated with the application, and a dummy item of the one or more dummy items is determined adaptively or by machine learning and identifies one of: an individual having an account on the application, a named account associated with an individual, and a group affiliation associated with an individual.

3. The method as described in claim 2 wherein the individual is one of: an individual associated with an enterprise but not authorized presently to have an account on the application, and an individual not associated with an enterprise.

4. The method as described in claim 1 wherein the effectiveness of the approver entity is a function of a number of dummy items augmented to the list, and a number of dummy items identified by the approver entity.

5. The method as described in claim 1 further including associating different dummy items to each of first and second accounts.

6. The method as described in claim 1 further including associating different weights to each of first and second dummy items, wherein a first weight associated with the first dummy item is higher than a second weight associated with the second dummy item to indicate that the first dummy item has a higher relative difficulty in locating as compared to the second dummy item.

7. The method as described in claim 1 wherein the characteristic of the approver entity is one of: a relative skill level of the approver entity, and a period of time that the approver entity has been acting as an approver.

8. An apparatus, comprising:
   a processor;
   computer memory holding computer program instructions executed by the processor to improve an identity and access management computing system that implements an automated recertification campaign with respect to an application in an enterprise, the computer program instructions comprising:
   program code operative to select accounts for recertification in accordance with a recertification policy to generate a list of accounts;
   program code operative to augment the list with one or more dummy items, wherein the one or more dummy items represent additional accounts on the application and are configured to appear on the list as legitimate accounts;
   program code operative to provide for approval the list including the one or more dummy items, the list being provided to an approver entity; and
   program code responsive to receipt from the approver entity of an approval to initiate the recertification campaign to quantify an effectiveness of the approver entity in locating the one or more dummy items from the list and generate a result;
   program code to use the result as an enterprise metric in association with a compliance component of the identity and access management computing system;
   wherein at least one dummy item of the one or more dummy items is selected for inclusion in the list based on a characteristic of the approver entity.

9. The apparatus as described in claim 8 wherein the recertification campaign is associated with the application, and a dummy item of the one or more dummy items is determined adaptively or by machine learning and identifies one of: an individual having an account on the application, a named account associated with an individual, and a group affiliation associated with an individual.

10. The apparatus as described in claim 9 wherein the individual is one of: an individual associated with an enterprise but not authorized presently to have an account on the application, and an individual not associated with an enterprise.

11. The apparatus as described in claim 8 wherein the effectiveness of the approver entity is a function of a number of dummy items augmented to the list, and a number of dummy items identified by the approver entity.

12. The apparatus as described in claim 8 wherein the computer program instructions further include program code to associate different dummy items to each of first and second accounts.

13. The apparatus as described in claim 8 wherein the computer program instructions further including program code to associate different weights to each of first and second dummy items, wherein a first weight associated with the first dummy item is higher than a second weight associated with the second dummy item to indicate that the first dummy item has a higher relative difficulty in locating as compared to the second dummy item.

14. The apparatus as described in claim 8 wherein the characteristic of the approver entity is one of: a relative skill level of the approver entity, and a period of time that the approver entity has been acting as an approver.

15. A computer program product in a non-transitory computer readable medium for use in a data processing system, the computer program product holding computer program instructions which, when executed by the data processing system, to improve an identity and access management computing system that implements an automated recertification campaign with respect to an application in an enterprise, the computer program instructions comprising:

program code operative to select accounts for recertification in accordance with a recertification policy to generate a list of accounts;

program code operative to augment the list with one or more dummy items, wherein the one or more dummy items represent additional accounts on the application and are configured to appear on the list as legitimate accounts;

program code operative to provide for approval the list including the one or more dummy items, the list being provided to an approver entity; and program code responsive to receipt from the approver entity of an approval to initiate the recertification campaign to quantify an effectiveness of the approver entity in locating the one or more dummy items from the list and generate a result;

program code to use the result as an enterprise metric in association with a compliance component of the identity and access management computing system;

wherein at least one dummy item of the one or more dummy items is selected for inclusion in the list based on a characteristic of the approver entity.

16. The computer program product as described in claim 15 wherein the recertification campaign is associated with the application, and a dummy item of the one or more dummy items is determined adaptively or by machine learning and identifies one of: an individual having an account on the application, a named account associated with an individual, and a group affiliation associated with an individual.

17. The computer program product as described in claim 16 wherein the individual is one of: an individual associated with an enterprise but not authorized presently to have an account on the application, and an individual not associated with an enterprise.

18. The computer program product as described in claim 15 wherein the effectiveness of the approver entity is a function of a number of dummy items augmented to the list, and a number of dummy items identified by the approver entity.

19. The computer program product as described in claim 15 wherein the computer program instructions further include program code to associate different dummy items to each of first and second accounts.

20. The computer program product as described in claim 15 wherein the computer program instructions further including program code to associate different weights to each of first and second dummy items, wherein a first weight associated with the first dummy item is higher than a second weight associated with the second dummy item to indicate that the first dummy item has a higher relative difficulty in locating as compared to the second dummy item.

21. The computer program product as described in claim 15 wherein the characteristic of the approver entity is one of: a relative skill level of the approver entity, and a period of time that the approver entity has been acting as an approver.

\* \* \* \* \*